United States Patent
Woodsum

(10) Patent No.: US 8,948,718 B2
(45) Date of Patent: Feb. 3, 2015

(54) DEVICES AND METHODS USING THE HERMETIC TRANSFORM

(71) Applicant: Hobbit Wave, Inc., Weston, MA (US)

(72) Inventor: Harvey C. Woodsum, Bedford, NH (US)

(73) Assignee: Hobbit Wave, Inc., Weston, MA (US)

( * ) Notice: Subject to any disclaimer, the term of this patent is extended or adjusted under 35 U.S.C. 154(b) by 0 days.

(21) Appl. No.: 13/788,556

(22) Filed: Mar. 7, 2013

(65) Prior Publication Data

US 2013/0252568 A1    Sep. 26, 2013

Related U.S. Application Data

(60) Provisional application No. 61/607,743, filed on Mar. 7, 2012.

(51) Int. Cl.
| | | |
|---|---|---|
| *H04B 1/10* | (2006.01) | |
| *G01S 3/14* | (2006.01) | |
| *H04B 7/08* | (2006.01) | |

(52) U.S. Cl.
CPC ............... *H04B 1/1027* (2013.01); *G01S 3/14* (2013.01); *H04B 7/086* (2013.01)
USPC .......................................... 455/296; 342/417

(58) Field of Classification Search
USPC .............. 455/296; 342/81, 417, 423; 375/347
See application file for complete search history.

(56) References Cited

U.S. PATENT DOCUMENTS

| | | | |
|---|---|---|---|
| 4,338,605 A * | 7/1982 | Mims ............................ | 342/373 |
| 4,989,090 A | 1/1991 | Campbell et al. | |
| 5,479,176 A | 12/1995 | Zavrel, Jr. | |
| 5,892,847 A | 4/1999 | Johnson | |
| 6,101,399 A * | 8/2000 | Raleigh et al. ................. | 455/561 |
| 6,185,440 B1 | 2/2001 | Barratt et al. | |
| 6,229,486 B1 | 5/2001 | Krile | |
| 6,408,109 B1 | 6/2002 | Silver et al. | |
| 6,421,007 B1 * | 7/2002 | Owen et al. .................... | 342/417 |
| 6,427,531 B1 | 8/2002 | Chintawongvanich | |
| 6,876,693 B2 | 4/2005 | Sim et al. | |
| 6,943,732 B2 | 9/2005 | Gottl et al. | |
| 6,947,470 B2 | 9/2005 | Berens et al. | |
| 7,012,978 B2 | 3/2006 | Talwar | |
| 7,092,690 B2 | 8/2006 | Zancewicz | |
| 7,103,537 B2 | 9/2006 | Witzgall et al. | |
| 7,106,785 B2 | 9/2006 | Yoshida et al. | |
| 7,260,370 B2 | 8/2007 | Wang et al. | |
| 7,280,627 B2 * | 10/2007 | Orlin .............................. | 375/347 |
| 7,450,067 B2 | 11/2008 | Xin | |
| 7,873,016 B2 | 1/2011 | Kim | |
| 7,925,234 B2 | 4/2011 | Yeh et al. | |
| 8,005,162 B2 | 8/2011 | Cai et al. | |

(Continued)

OTHER PUBLICATIONS

International Search Report issued for PCT/US13/29613, dated May 8, 2013 (2 pages).

(Continued)

*Primary Examiner* — Creighton Smith
(74) *Attorney, Agent, or Firm* — Wilmer Cutler Pickering Hale and Dorr LLP

(57) ABSTRACT

Systems and methods are described using a Hermetic Transform, as well as related transforms, for applications such as directional reception and/or transmit of signals using phased-array devices and systems. The systems and methods an include identifying a direction of arrival for a mobile communicating device.

9 Claims, 14 Drawing Sheets

(56) References Cited

U.S. PATENT DOCUMENTS

| | | | |
|---|---|---|---|
| 8,064,408 | B2 | 11/2011 | Woodsum |
| 2003/0216156 | A1* | 11/2003 | Chun .......................... 455/562.1 |
| 2004/0120429 | A1* | 6/2004 | Orlin ............................. 375/347 |
| 2005/0101253 | A1 | 5/2005 | Pajukoski et al. |
| 2005/0141545 | A1 | 6/2005 | Fein et al. |
| 2005/0271016 | A1 | 12/2005 | Kim et al. |
| 2006/0053005 | A1 | 3/2006 | Gulati |
| 2006/0244660 | A1 | 11/2006 | Ann et al. |
| 2007/0164902 | A1 | 7/2007 | Bang et al. |
| 2007/0189362 | A1 | 8/2007 | D'Amico et al. |
| 2007/0213013 | A1 | 9/2007 | Kim |
| 2008/0260066 | A1 | 10/2008 | Cai et al. |
| 2009/0237294 | A1* | 9/2009 | Shoji et al. ..................... 342/159 |
| 2009/0239551 | A1 | 9/2009 | Woodsum |
| 2010/0178057 | A1 | 7/2010 | Shieh |
| 2010/0272005 | A1* | 10/2010 | Larsson et al. ................. 370/315 |
| 2011/0288823 | A1 | 11/2011 | Gupta |
| 2012/0027111 | A1* | 2/2012 | Vook et al. ..................... 375/267 |
| 2012/0262328 | A1 | 10/2012 | Shinonaga et al. |

OTHER PUBLICATIONS

Rao, C.R., "Estimation of Variance and Covariance Components in Linear Models," J. Stat. Assoc., Issue 337, Mar. 1972, pp. 112-115; Published online Apr. 2, 2012.

Doblinger, "Beamforming with Optimized Interpolated Microphone Arrays," IEEE HSCMA Conference Proceedings, pp. 33-36 (2008).

Gabel and Roberts,"Signals and Linear Systems", 2nd Edition, John Wiley & Sons, New York, pp. 327-332, 345 (1980) (Total 9 pgs.).

Goshi, et al., "A Compact Digital Beamforming SMILE Array for Mobile Communications", IEEE Transactions on Microwave Theory and Techniques, vol. 52, No. 12 (Dec. 2004) (7 pgs.).

International Search Report and Written Opinion issued by the U.S. Patent and Trademark Office as International Searching Authority in International Application No. PCT/US13/53422 dated Oct. 4, 2013 (11 pgs.).

International Search Report and Written Opinion issued by the U.S. Patent and Trademark Office as International Searching Authority in International Application No. PCT/US09/034264, dated Apr. 23, 2009 (10 pgs.).

Monzingo and Miller, "Introduction to Adaptive Arrays", John Wiley & Sons, p. 274 (1980) (Total 78 pgs.).

* cited by examiner

FIVE NULL ANTENNA PATTERN FROM A 4-ELEMENT ANTENNA ARRAY

US 8,948,718 B2

DEVICES AND METHODS USING THE HERMETIC TRANSFORM

CROSS-REFERENCE TO RELATED APPLICATIONS

This application claims priority under §119(e) to U.S. Provisional Application No. 61/607,743, entitled "Devices and Methods Using the Hermetic Transform and Related Linear Transform Approaches," filed Mar. 7, 2012, the contents of which are incorporated by reference herein in its entirety and for all purposes.

BACKGROUND OF THE INVENTION

This disclosure deals with systems and methods using a Hermetic Transform, as well as related transforms, for applications such as directional reception and/or transmit of signals using phased-array devices and systems. The Hermetic Transform (and related transforms) can be designed using an array manifold, effectively a complex calibration response vectors from the array in question to signal arrivals from different directions, whether developed from a mathematical model or from collected data, arranged in a particular fashion. The transform can be utilized for receiver and/or transmit beams to provide narrower main-lobes than classical methods would typically allow. Further background about the Hermetic Transform can be found in U.S. Pat. No. 8,064,408, incorporated herein by reference in its entirety and for all purposes.

SUMMARY OF THE INVENTION

Systems and methods are described for using the Hermetic Transform for beamforming and other purposes. These systems and methods include techniques for beamforming, noise conditioning, and creating poles and zeros. As indicated in the incorporated patent, there are many applications, including cellular communication systems, e.g., for finding a direction of arrival of one or more mobile units, but other applications include identifying jammer signals and any other beamforming application.

The systems can include a plurality of N elements for receiving signals, where N is a natural number greater than 1, and analog to digital circuitry for processing the received signals to produce digital signals. In each case, the elements can be antennas or other receivers, such as for receiving sound. The systems can operate with cellular communications base stations or other wireless systems for identifying mobile units.

In one embodiment, a processor is provided for processing the digital signals by multiplying the digital signals by a noise conditioning matrix, performing a Hermetic Transform on the noise conditional data, and determining one or more angles of arrival of the received signals based on the noise conditioned and transformed data, wherein the noise conditioning matrix is derived from the covariance of the internal noise. The processor can further perform a power spectral density from beam time-series, or time average the square of the magnitude of the transformed data, and/or prior to the noise conditioning, derive a covariance matrix of the digital signals.

In another embodiment, the processor processes signals including performing a Hermetic Transform on the data, multiply the result of the transform by null transform matrices to create nulls in the spatial transfer function, wherein the number of nulls M is greater than N. The number of nulls M can be greater than 2N, or up to N squared minus one. The signals can be noise conditioned by a noise conditioned matrix derived from the covariance of internal noise prior to being transformed. The at least one of the null transform matrices can be raised to a power R.

In another embodiment, a processor is for receiving signals corresponding to a plurality of beam directions and forming the signals in a matrix, for one beam direction, setting values to zero to derive a covariance matrix from signal arrivals for from other beam directions other than the one direction, and deriving a beam vector from a signal vector and the covariance matrix. The processor can perform the functions of setting values to zero to derive a covariance matrix from signal arrivals for from other beam directions other than the one direction, and deriving a beam vector from a signal vector and the covariance matrix, for a plurality of beam directions.

For each of the systems identified above and elsewhere in the specification, methods for processing can be performed.

Other features and advantages will become apparent from the following description and drawings.

DETAILED DESCRIPTION

Figure 1:
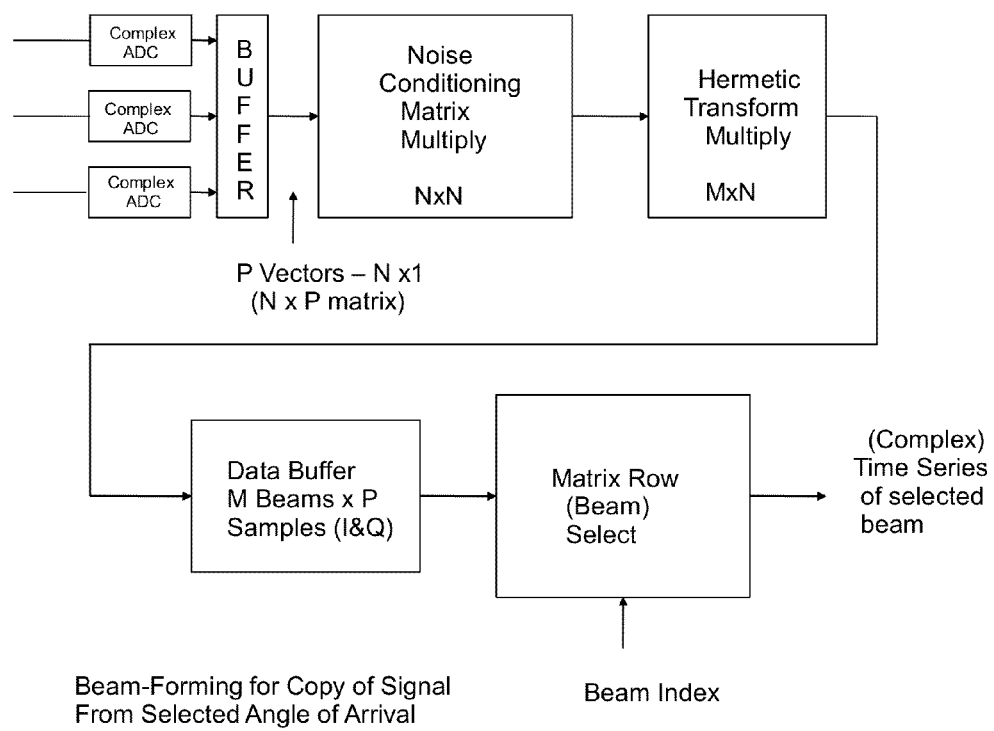
FIGS. 1-4 are block diagrams of processing steps performed according to methods described herein.

A conventional approach utilized for directional reception is based on a spatial matched filter. The spatial matched filter forms a beam in a given direction, characterized by a set of direction cosines ($\alpha$, $\beta_i$, $\gamma$), by multiplying each array element signal channel $\{V_i\}$ by the complex conjugate of the expected response from the given "look direction", and summing the result. The discussion below applies as well to the reception of vector fields (e.g., electromagnetic waves) as to scalar fields (e.g., acoustic pressure wave fields). However, indices related to vectors components and polarization are suppressed in the treatment, below, i.e., the fields of the received signal(s) are treated as scalar.

Assume there are M receiving directions ("look directions" or "beam-steering directions"), with a representative case being the m-th beam:

$$B(t;\alpha_m,\beta_{im},\gamma_m) = G\Sigma A_i^*(R_i;\alpha_m,\beta_{im},\gamma_m)\exp\{-j/\psi(R_i)\}V_i(t)$$

The sum is over the set of receiving N receiving elements in order to form a single beam in the desired look direction. The "G" term is a gain term used to normalize beam amplitude appropriately.

In practice, one method of determining the expected responses from the various arrival directions would be to measure the response for each direction empirically. This set of responses is termed an "array manifold." However, as an idealized case, it can be assumed that the array consists of a set of point-receiving elements at the positions $\{R_i\}$ and that the signal arrivals correspond to plane waves from a set of M discrete look directions corresponding to wave-vectors $\{k_m\}$, in which case an expression for the M beam outputs is as follows:

$$B_m(t) = \Sigma \exp(-j\, k_m \cdot R_i) V_i(t)$$

The wave-vector for plane wave arrival $k_m$ can be represented by $$k_m = (2\pi/\lambda)[\cos(\alpha_m), \cos(\beta_m), \cos(\gamma_m)]$$

Again, the sum is over the N receiving elements. For the case of M receiving beams, with M look-directions, the above expression can be written in terms of a linear (matrix) transformation as follows:

$$B = T*V$$

where for each time sample (t) the output of the beam former is a vector B with components $B_m$, the input samples are arrayed as column vector with components $V_i$, and the transformation matrix T has elements, $$T_{m,i} = \exp(-j k_m \cdot R_i)$$

For the above case of plane-wave arrivals, one recognizes that the linear transformation is essentially a Fourier Transformation in the space/wave-vector domain. In the case of regularly spaced elements, and linear or planar geometries, the use of Discrete Fourier Transform and Fast-Fourier Transform algorithms can be made to accomplish the above transformations with an efficient implementation in Digital Signal Processing (DSP) hardware. The spatial matched filter yields a maximum signal to noise ratio in the case of spatially uncorrelated ambient noise. Further, half-wavelength spacing (inter-element spacing of $L=\lambda/2$) of the array produces exactly zero correlation between the noise signals received. Two corollaries of this statement are: (1) the matched-filter beam-former above is known to be optimum in terms of signal to noise ratio under the stated circumstances, and (2) for an array with more closely spaced elements, the ambient noise signals received by the array elements become spatially correlated and therefore more 'signal-like' in terms of the processing approach that one might contemplate.

The condition $L=\lambda/2$ represents sampling at the spatial Nyquist Rate, the minimum spatial sampling that will avoid spatial aliasing, which would produce unwanted grating lobes, i.e., strong responses in unwanted directions away from the beam look-direction. It is known that the beam response of such an array to a given wave-vector has a beam shape that roughly conforms to the expression $\Delta K \, \Delta R \sim 1$ where $\Delta K$ corresponds to the beam ambiguity (main lobe width) in wave-vector space, and $\Delta R$ corresponds to the array dimension. For example, in the case of a one-dimensional, linear array of point elements of length D, the rule-of-thumb for beam-width in radians $\Delta \theta$ is given by:

$$\Delta \theta = \lambda/D$$

where $\lambda$ is the acoustic wavelength. The spatial filters (beams) that are formed essentially produce a significant response to signal arrivals only within a range of $\Delta \theta$ in angle around a chosen look direction. The actual response of the beam-former in the case of a linear array corresponds to the familiar patterns known from diffraction theory, and the above formula is sometimes referred to as the diffraction limit on resolution. This rule of thumb is a well-known type of uncertainty principle, taken for granted by system designers, often without regard to the underlying assumptions on which the result rests. The rule of thumb extends to a two-dimensional, rectangular, planar array, with dimensions $D_x$ and $D_y$, the angular "beam-widths" of the beam-former response, $\Delta \theta_x$ and $\Delta \theta_y$, correspond to the x and y dimensions in comparison to the signal wave-length:

$$\Delta \theta_x = \lambda/D_x$$

$$\Delta \theta_y = \lambda/D_y$$

As the dimensions of the array are reduced in relation to the wavelength of the arriving signal the ability of the array (when conventionally beam-formed) to discriminate the signal in the desired look-direction from interfering signals, noise, and reverberations arriving from directions other than the desired look-direction, diminishes. As the array gets smaller, the width of the beam main-lobe can "fatten" considerably. The spatial gain of the array against spatially isotropic noise, corresponds to how much of the noise field is rejected by the beam-forming process, in comparison to the $4\pi$ steradians of solid angle occupied by the noise.

The use of beam-forming is analogous to the use of filtering in the frequency domain to reject noise which is either spread out across a broad band or which is located at a frequency not corresponding to that of the signal (for example, use of FFT processing to detect narrow-band, sinusoidal signals in the presence of noise). In terms of a "rule of thumb", the array area can be divided into cells that are half-wavelength in each dimension; if there are N such cells, the isotropic noise gain is on the order of $10 \log_{10}(N)$ in decibels (dB). The smaller the array (in units of wavelength), the smaller the spatial processing gain.

As stated previously, half-wavelength spacing between elements provides maximum gain for a conventional beam-former. Reduction of side-lobe level response is accomplished by antenna channel weighting prior to application of the linear transform (beam-forming) matrix T. The resulting expression is given by the following:

$$B_m(t) = \Sigma \exp(-jk_m \cdot R_i)[W_i V_i(t)]$$

where the $\{W_i\}$ are a set of individual weight factors for each antenna channel and the sum is understood to run over the index i. The weights are normally real and positive, with a maximum value placed at the array center, and with the weighting function being designed to taper off towards the array edges. For this reason, the weighting function is sometimes called a "taper function." Reduction in side-lobe response (10 s of dBs) can be accomplished by channel weighting at the expense of a modest increase in the beam-width of the main lobe, and a modest reduction in spatial gain against spatially isotropic noise. A flip side of this is that the side-lobe reduction offers mitigation of strong interference from directions outside of the beam main-lobe.

Hermetic Transform Receive Beam-Forming Algorithm

An improved beam-forming approach can be designed for the case of spatially oversampled arrays ($L \ll \lambda/2$). In this case, the Fourier Transform is replaced with a different type of transform, termed a Hermetic Transform. The version described here is termed decomposable because it contains two individual linear transformations that are combined to form the Hermetic Transform. In the presence of internal system noise (electrical element noise) there is also a third transform component used to condition the transform against the influence of such noise(s).

To derive the form of the Hermetic Transform, we first note that the generation equation involving weighting above can be placed in the following form:

$$B = T*W*V$$

where the weight matrix W is diagonal, with elements $$W_{i,j} = W_i \delta_{i,j}$$

where $W_i$ is the weight for the i-th array element channel, and $\delta_{i,j}$ is the Kronecker delta function, $$\delta_{ij} = 1, \text{ for } i = j$$
$$= 0, \text{ otherwise}$$

We then formally define $$H = T^*W$$

The linear transformation H combines the matched filter matrix T and a weight matrix W into one single linear transformation. So far, this is a rearrangement of terms. However, while recognizing that the separable W matrix term has an effect on controlling sidelobe levels and mainlobe width, the question arises whether a weight matrix W can be "designed" so as to improve the resolution of the overall beam-forming process.

For simplicity assume a problem with a single arrival angle parameter $\theta$. We assume M look-directions $\{\theta_m, m=1, 2, \ldots M\}$ and expected complex signal arrivals at each array element (collectively, "the array manifold") $\{S_i(\theta_m), i=1, 2, \ldots N\}$. A signal matrix $\Sigma$ is thus defined to have elements according to the following expression:

$$\Sigma_{im} = S_i(\theta_m)$$

and the matched filter transformation matrix, T is given by $$T = \Sigma^H$$

where the superscript "H" indicates the Hermitian Transpose, or complex-conjugate transpose of the matrix.

We pose the following equation for the design of "ideal" beams:

$$H\Sigma = TW\Sigma = \Sigma^H W\Sigma = I$$

where I is the identity matrix. The interpretation of this expression is as follows: it is desired to "design" a weight matrix W (complex and not necessarily diagonal) such that the beam-forming transformation H (the Hermetic Transform) when applied to m-th signal arrival vector (dimension N×1) with components $S_i(\theta_m)$ produces an (M×1) vector output with a value of "1" in the m-th row and zeros elsewhere. If such a solution could be determined, it would represent an "ideal" beam-forming transformation, with delta-function beams. However, in practice, the idea is to find a solution that is as close as possible to satisfying the above equation according to some objective function to be minimized. Such solution has been derived, as follows:

$$W = (\Sigma\Sigma^H)^{\#}\Sigma(I)\Sigma^H(\Sigma\Sigma^H)^{\#}$$

Here the "#" symbol represents the pseudo-inverse of the bracketed quantity (Gelb notation), and "superscript H" indicates the Hermitian Conjugate of the quantity. The pseudo-inverse is based on the Singular Value Decomposition (SVD) of the target matrix, with any singular values having magnitude less than a pre-set threshold set to zero so that the pseudo-inverse operates only over the subspace corresponding to significant singular vectors, i.e. those with significant singular value magnitudes. The generalization of the above expression replaces the identity matrix, with a desired response matrix $\rho$:

$$W = (\Sigma\Sigma^H)^{\#}\Sigma(\rho)\Sigma^H(\Sigma\Sigma^H)^{\#}$$

The above solution corresponds to Rao's concept of a Minimum Norm Quadratic Estimator (MINQUE). C. R. Rao, "Estimation of Variance and Covariance Quantities in Linear Models", J. Stat. Assoc., Issue 3, pp. 1818-1818 (March 2010) Volume 67:112-115

Beam-Forming Using Other Array Representations

In the formulation above, data is used directly in the construction of the Hermetic Transform. The present invention can also be made to work with other representations, for time snapshots from an N-element array can be transformed using a linear transformation which combines elements to create fewer or greater numbers of signal vector components. For example data from an 8-element array arranged around a circle can be combined into omni, sine, and cosine pattern channels, as is common in direction finding applications. Such arrays can be beam-form. A linear array of four elements can be transformed using an FFT of arbitrary size with zero-padding to form signal vectors of arbitrarily large size.

Noise Conditioning of the Hermetic Transform

In the presence of electrical noise, or other non-ambient noise, a noise conditioning matrix is developed to reduce uncorrelated white-noise gain and improve robustness, as a spatial pre-processor prior to transformation. If we term $H_0$ the unconditioned Hermetic Transform result as presented above, and $H_1$ the noise-conditioned Hermetic Transform, the following equations apply:

$$H_1 = H_0 N_F$$

$$N_F = \text{cov}(\Sigma)^*[\text{cov}(\Sigma) + \text{cov}(N)]^{\#}$$

where $N_F$ is a noise-filtering transformation (matrix) selected to make the noise-corrupted signals as close to the clean, array manifold signal as possible, in a minimum-quadratic-norm sense, and cov( ) indicates the spatial, element-to-element covariance operation being performed on the array manifold ($\rho$) and on the internal noise (N). Empirically, performance turns out to be robust with respect to errors in the noise covariance estimates (cov(N)).

Wave-Vector Power Spectrum/Direction Finding

A wave-vector power spectrum (Power Spectral Density or PSD) can be used to determine a direction of arrival (DOA) to signal sources (emitters). The wave-vector PSD is essentially signal arrival power as a function of DOA (wave-vector). The methods involved are analogous to PSD methods involving DFT/FFT techniques for time series, with the contradistinction that Hermetic Transforms are utilized instead. Examples of such time series techniques are the Blackman-Tukey and Periodogram PSD approaches. Peaks in the PSD imply arrivals from specific direction. When applied to radio-frequency signals the determination of arrival angle using PSD is termed radio direction finding, or just "direction finding" (RDF/DF).

Figure 2:
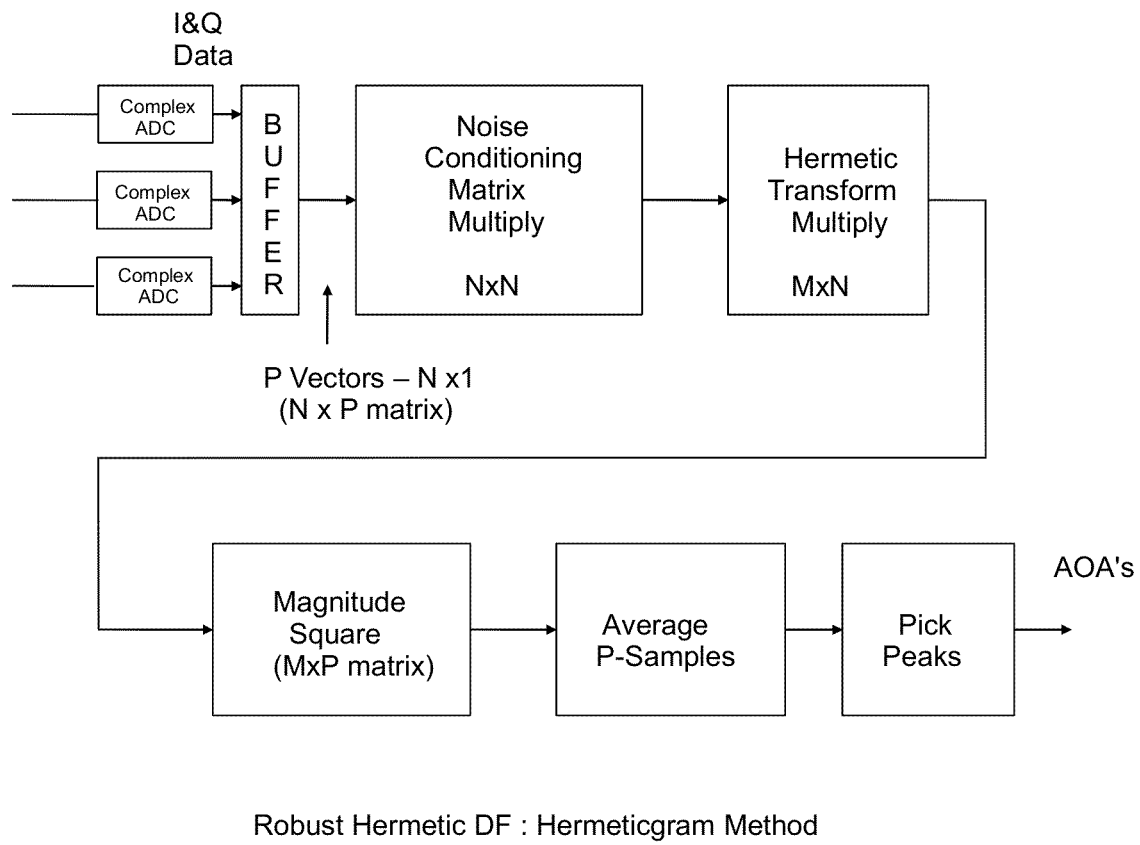
Figure 3:
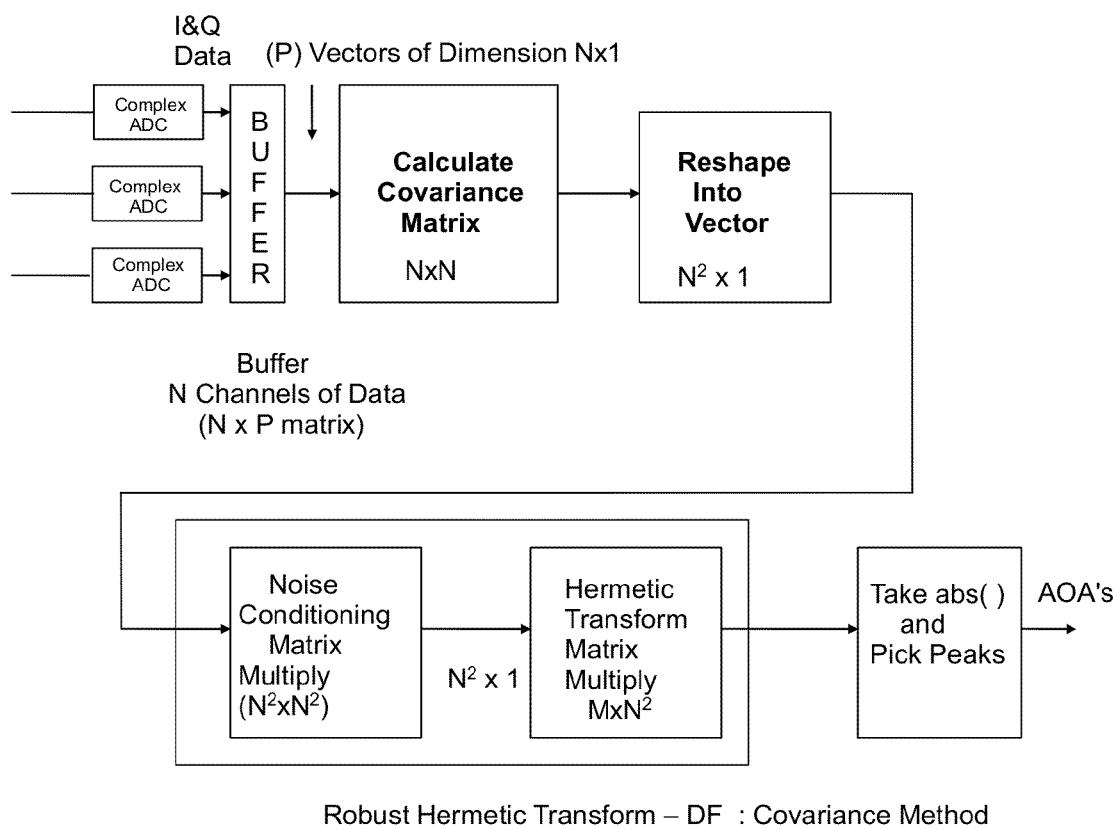

There are several direct methods for obtaining the wave-vector PSD. As shown in FIG. 1, one method involves forming beams first by applying the Hermetic Transform to element data vectors, and then processing data from each beam to obtain the PSD from the various beam time-series. Referring to FIG. 2, another method includes applying beam-forming first, and then time averaging the modulus squared from the complex time series of each beam. Referring to FIG. 3, another method utilizes a Hermetic Transform derived from an array manifold produced from a set of vectors formed from signal covariance matrices (each M×M for an M-element array) reshaped into column vectors (dimension $M^2 \times 1$), arranged in columns, with each column corresponding to a given DOA for the manifold. When this transform is applied to the similarly re-shaped covariance matrix from a single arrival or from set of incoherent (uncorrelated) arrivals, a wave-vector PSD estimate is produced. Peaks in the PSD produced from any of the above methods correspond to DF estimates of directions-of-arrival for signals arriving at the array.

Spatial Filtering and Interference Nulling

Figure 4:
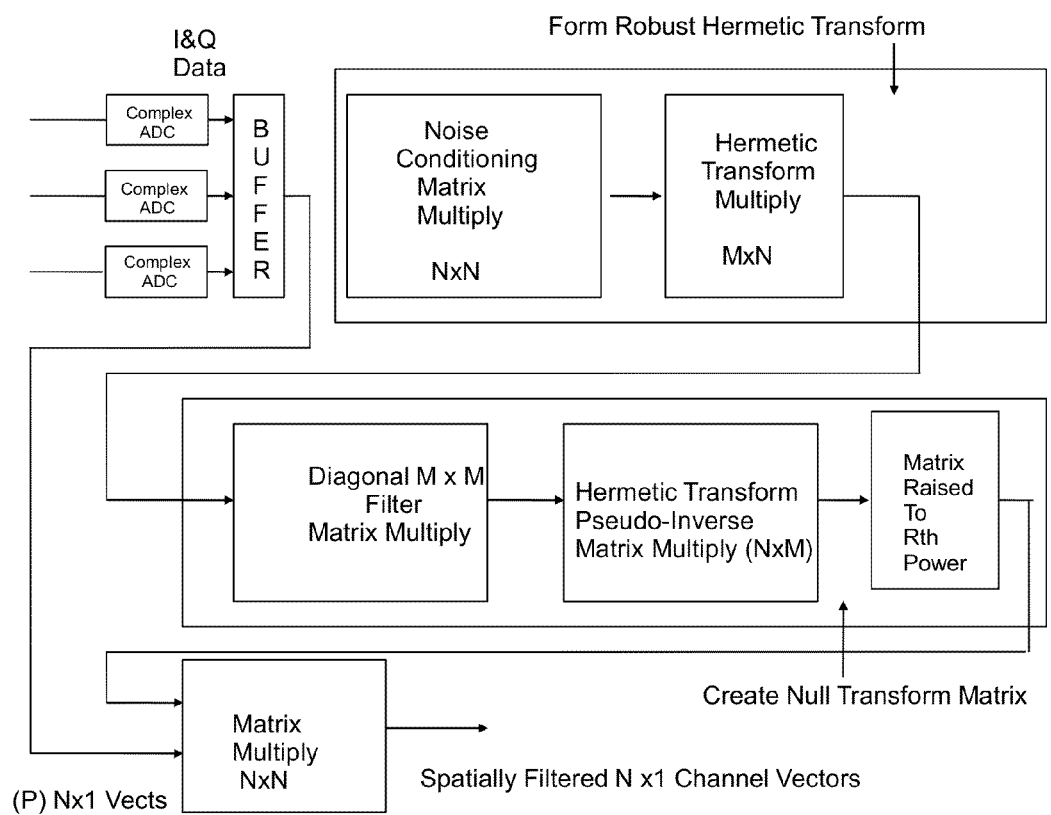

The Hermetic Transform has at least a pseudo-inverse (#), so that filtering in the wave-vector (beam-space) domain can be accomplished using the following steps. FIG. 4 is a block diagram of an exemplary implementation that further includes a noise conditioning step.

(1) Multiply a complex data "snap-shot" (I&Q samples from each array element) by the Hermetic Transform Matrix H (after an optional noise conditioning step as described herein). Each "snap-shot" vector is an N×1 column vector for an N-element array. The Hermetic Transform has dimension M×N for N-DOAs in the array manifold. The result has dimension N×1 (column vector) in 'beam-space".

(2) Multiply the result by an M×M filtering matrix ($\Lambda$) The result is an N×M matrix.

(3) Multiply the result of this operation by the pseudo-inverse of the Hermetic Transform Matrix, $H^{\#}$ (dimension N×M). The result is a column vector N×1.

The above matrices can be pre-multiplied to produce a filter transform with particular desired characteristics according to the following expression:

$$F=H^{\#}\Lambda H$$

As an example, an elemental filter matrix can be designed to place one null in a particular direction (the p-th DOA) would use a $\Lambda$ matrix which is the modified identity matrix. The identity matrix has all ones on the diagonal and zeros elsewhere. In order to introduce a null, one of the diagonal elements (element in the p-th row, p-th column) is set to zero. The resulting filter matrix can be raised to a power (Rth power) in order to control the strength of the null. This matrix offers the analogous function of placing a "zero" into the spatial transfer function. Similarly an elemental filter matrix can be constructed to emphasize signals only in one direction (the p-th DOA) by starting with a $\Lambda$ matrix that is all zeros, except for the element in the p-th row and p-th column, the value of which is set to unity. The resulting filter matrix (M×M) can be raised to a power (Rth) in order to control the strength of what amounts to a "pole" (beam) or "zero" (null) in the spatial transfer function. The matrices can also be normalized, for example by dividing by the trace of the matrix in order to control numerical precision problems.

Figure 5:
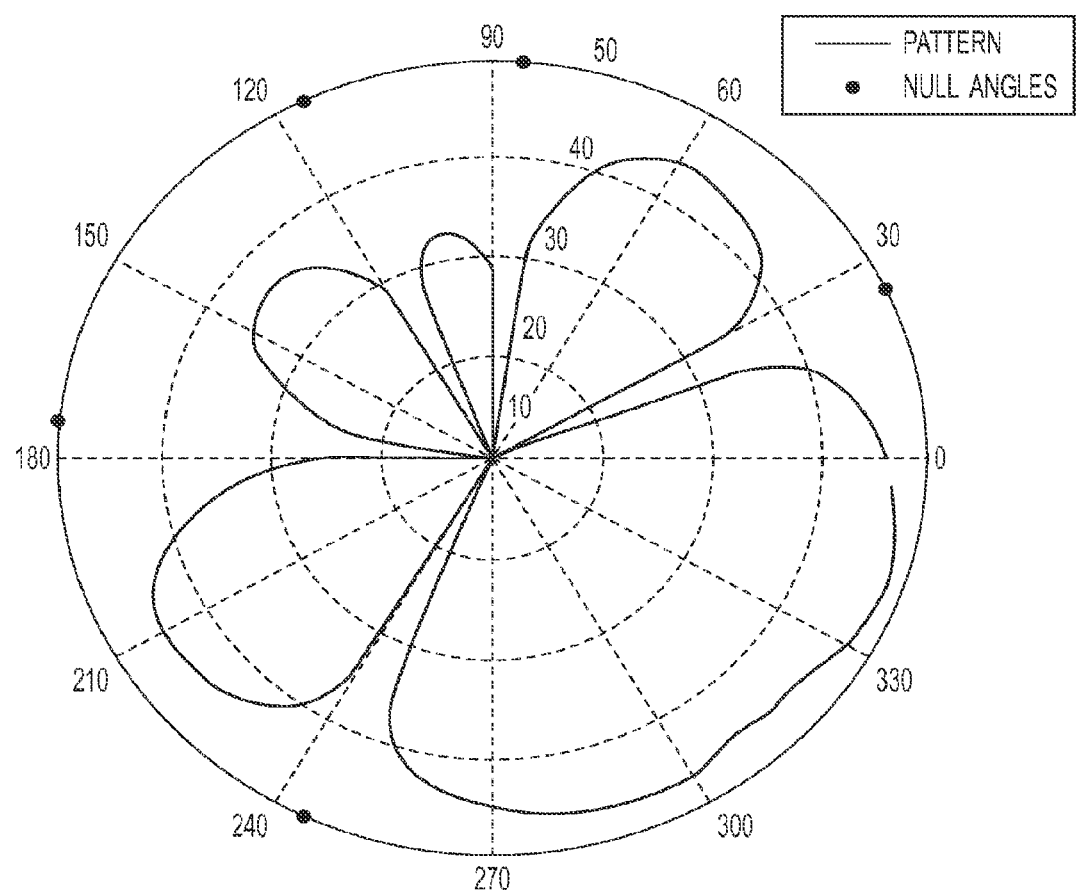
FIGS. 5-8 are plots showing results from systems and methods described herein.

Such elemental matrices can be multiplied/cascaded to create shaping of the array response to signal arrivals from particular directions. The matrix multiplication operations do not necessarily commute, therefore different permutations of filtering orders using the same set of filter matrices can produce significantly different results. One of the interesting results obtained using the above approach is that there can be more nulls placed in the response pattern than the conventional limit of (N−1) independent nulls for an array with N elements. FIG. 5 shows five nulls in an otherwise omnidirectional pattern at a single frequency, which was accomplished with a 4-element array. One could get 10-15 nulls with four (4) antennas, and potentially up to $N^2-1$; i.e., one could get at least 2N, 3N, or 4N nulls, up to $N^2-1$ with N antennas.

Representative Performance Comparison

A representative problem is presented here in order to illustrate advantages that can accrue from the use of Hermetic Transform beamforming in the processing of signals arriving at a small array under realistic conditions.

Consider as an example, a circular underwater acoustic array of diameter 0.21 meters (8.3 inches) with 18 elements arranged at uniform intervals around the circle. Similar results can be obtained for systems of antenna elements operating at radio and microwave frequencies.

From the formula $\lambda=c/f$, c being the speed of sound waves in the medium and f being the frequency, one computes that this array has a diameter of approximately $0.14\lambda$, for a speed of sound in sea water of 1524 M/sec (5000 feet/sec) at a frequency of 1000 Hz. A comparison of the beam amplitude pattern resulting from the use of a Hermetic Transform vs. a conventional phased-array beam-forming with no amplitude shading was obtained using a calculation in a MATLAB™ program.

The comparison showed an oval plot with the Hermetic Transform beam-response to a 1000 Hz plane wave impinging of the array with a direction of arrival of 0 degrees (seen to correspond to the maximum response of the beam) while a conventional phased-array beam-forming approach provided a substantially circular plot shows the corresponding response of beam-patterns produced by the Hermetic Transform beam-forming approach for this same array over a set of frequencies spanning 1000-5000 Hz provided multiple oval lobes.

This result indicates that the beam-shape is relatively frequency insensitive over this range of frequencies where the array diameter is substantially less than a wavelength.

Detection performance with respect to simulated signals arriving in the presence of simulated ambient noise interference, demonstrates improvement (for Hermetic vs. conventional Beam-Forming) in the metrics of detection probability and probability of false alarm which correspond to the predicted improvement spatial noise gains. The latter are calculated based on predicted beam patterns for both the Hermetic Transform approach and the Conventional phased-array approach. For a simple case of an arriving monochromatic complex sinusoidal place wave arriving at the array described above in the presence of an isotropic noise field consisting of independent Gaussian noises arrival from all directions (360 degrees), curves were derived from a MATLAB-based simulation.

The curves show a cumulative probability of detection for signal arrivals and noise only arrivals versus detection threshold when conventional beam-forming is applied to 1000 Hz signal having a −6 dB signal to noise ratio at each element of the 18-element array. The curves tests show the corresponding results for the case of Hermetic Transform beam forming of the same array. The increase in detection performance resulting from the application of the Hermetic Transform beam forming process, as observed in the simulation experiment, corresponds to an extra spatial gain of approximately 12 dB in signal to noise ratio. Curves are shown in the provisional application.

A visible graphic representation of the improvement in detection performance for the case described above is shown in the provisional application. Two plots are shown, which represent a plot of energy vs. time at the output of the conventional, phased-array beam forming process and the Hermetic Transform beam forming Process. The x-axis is bearing (direction of arrival), the y-axis is time, as an ensemble of time records are presented, and the energy of each beam (bearing) is represented by intensity and pseudo-color. Visual detection of a signal in this representation is accomplished by observing differences in the intensity and color of the data being presented relative to the surrounding ambient background. The conventional plot shows no differentiation between signal and isotropic noise, while the Hermetic Transform plot shows a band of energy at a particular bearing, corresponding to the direction of the signal arrival. The signal arrival is at −6 dB (array element) signal-to-noise ratio (SNR). The improvement in visual detection of the signal arrival illustrates a benefit of the gain provided by the Hermetic Transform Beam-Forming of the array as compared to the conventional phased array, which offers little benefit for an array this small in comparison to the wavelength of the signal.

Effect of the Noise Conditioning Matrix on the Hermetic Beam-Forming

Figure 6:
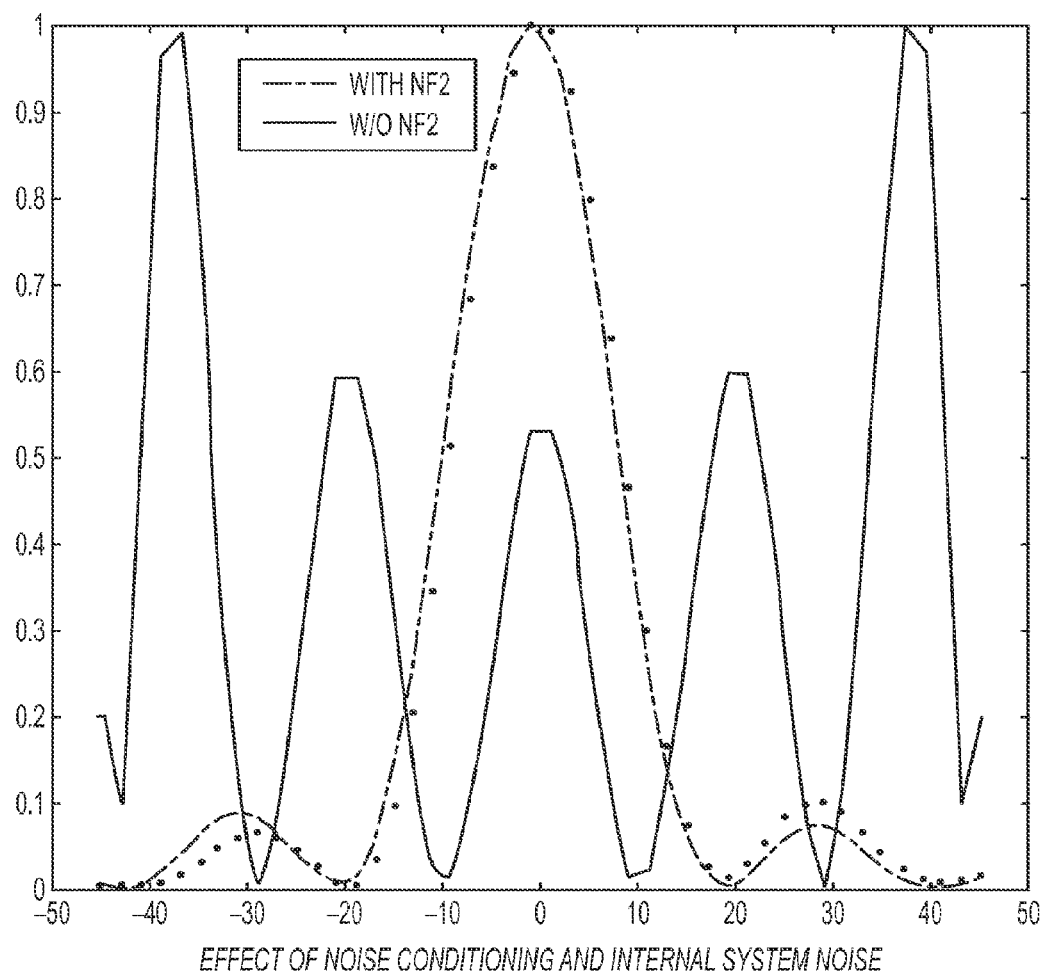

The discussion above justifies a need for dealing with the case of internal system noise that is spatially uncorrelated, element to element, using a noise filtering or noise conditioning matrix. The effect of this noise conditioning matrix has been measured using real data and shown to offer value in producing a robust Hermetic Transform in the presence of such internal noise. FIG. 6 indicates a rectilinear representation of the beam-pattern of a 7-element array having a single plane-wave arrival which is observed in the presence of significant internal noise (~−10 dB signal to internal noise ratio). The array length is 0.67 lambda. The ideal pattern predicted based on use of the unconditioned Hermetic transform on a noise-free signal (DOA=0 degrees) is shown in figure with one large central peak. The measured pattern observed using the unconditioned Hermetic Transform in the presence of the internal noise is also shown with five peaks. Finally, the measured pattern observed when the Hermetic Transform is conditioned using the procedure described above is applied, is shown in the figure with "dots" representing measured data. The noise conditioning is shown to restore the pattern to essentially the "ideal" value. The benefits of the Hermetic Transform are not altered by adding this additional step of noise conditioning.

FIGS. 1-4 are block diagrams of systems described elsewhere herein, and each includes a noise conditioning step before the Hermetic Transform.

Related Linear Transformations (WRING Transform)

An alternative formulation of a linear transformation that produces similar results to that of the Hermetic Transform, at least to within finite precision of the calculations, has been discovered. This transform has been termed the "WRING Transform."

One formulation of an optimal spatial matched filter for beamforming, is known in the adaptive beam forming literature as the Direct Matrix Inverse (DMI) method. In this method, an estimate of the inverse of the spatial covariance matrix of the noise interference, such interference consisting of a set of background signals and noise which one desires to reject through beam forming, is multiplied by the input signal vector before applying phases shifts and summing to form the beam. According to Monzingo and Miller, "Introduction to Adaptive Arrays", Section 3.3.2, a beam $\beta(\theta_m)$ in the direction of $\theta_m$ can be formed using DMI using the signal reference vectors $V(\theta_m)$ as previously described and the inverse of the interference covariance matrix $R_{nn}^{-1}$ according to the expression $$\beta(\theta_m) = [V(\theta_m)]^H R_{nn}^{-1}$$

The first term on the right-hand-side (RHS) of the above equation is the spatial matched filter to the arriving signal; the second term is a spatial "pre-whitener" of the interfering background.

As described in Monzingo and Miller, the interference covariance matrix is formed from the time averaged outer product of the Hermitian Conjugate (complex conjugate transpose) of the received data vector with the received data vector for the case where noise/interference only is present.

If the signal and noise interference are not simultaneously present, so that the interference statistics (covariance matrix) can be estimated without signal contamination (for example in the case of time-slotted or pulsed signals) and the noise interference is wide-sense stationary, then the DMI technique can be effective.

The present method applies similar mathematical reasoning to that used to derive the DMI to develop a different approach, a beam-forming transform which is fixed for a given array configuration and signal frequency, and which is not dependent on the specific noise interference and thus need not be data-adaptive.

The essence of the transform generation is as follows:

For each beam index $\{j\}$, for j=1, 2, . . . , (Number of Beams)

$$\Sigma(\theta_1, \theta_2, \theta_3, \ldots) = \|V(\theta_1)V(\theta_2)V(\theta_3) \ldots \mu^H$$

(1) form a Matrix
(2) Set all values in row $\{j\}$ to be zeros, set this matrix=$\sigma$
(3) Form a covariance matrix, $$R = \sigma^H \sigma$$

(4) The j-th row of the Transform Matrix T is given by $$[V(\theta_j)]^H R^\#$$

The concept of this approach is that signals that would correspond to all other beams being formed are treated as sources of interference (noise) in the creation of a noise/interference covariance matrix; the matrix inverse in the conventional DMI technique is replaced with the pseudo-inverse (# symbol in the above equation).

(5) The beam vector $\beta(\theta_m)$ are formed from a signal vector u using the beam-forming transform matrix multiplied by the signal vector, according to the equation $$\beta(\theta_m) = Tu$$

Figure 7:
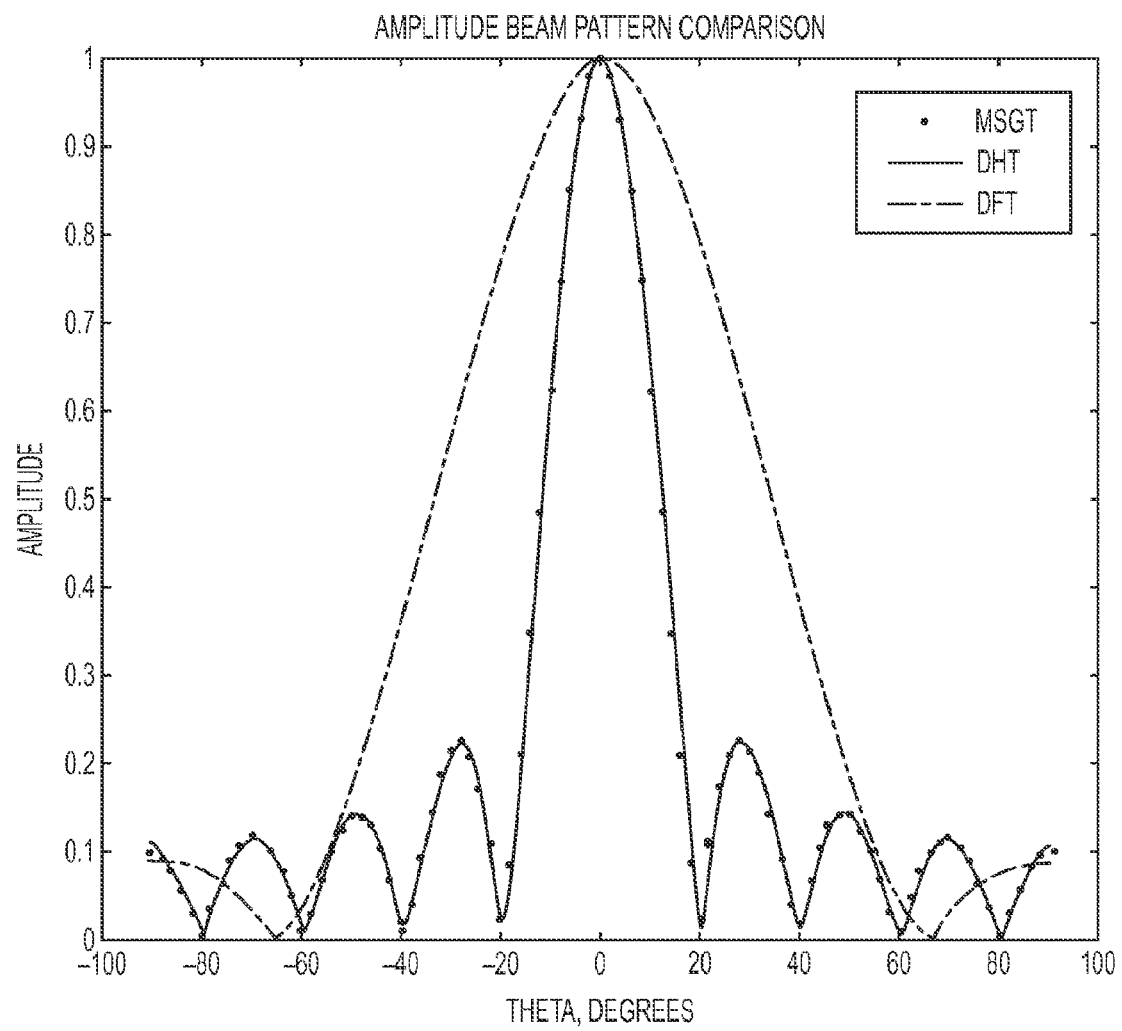

The success of the above technique is based on a discovery that the transformation matrix which results is in most cases nearly identical to that which results from the Hermetic Transform approach, which, in turn is designed to achieve maximum spatial gain. FIG. 7 provides an example produced using a MATLAB™ analysis/simulation. The simulated array is a one-dimensional, linear array with eleven (11) receiving elements, with the array being one wavelength (lambda) in length. The elements are ideal point elements with no appreciable aperture. The curve shown with one broad main peak is the amplitude pattern of the broadside beam generated with conventional Discrete-Fourier Transform processing. The pattern with a sharper main peak was generated using the Discrete Hermetic Transform. The points correspond to the pattern generated using the technique of the present invention, the MSG beam.

Beamforming of Spatially Interpolated Arrays

Both the Discrete Hermetic Transform (DHT) and MSG Transform (MGST) for beamforming or spectrum analysis, require the signal to be over-sampled, with elements less than half wavelength spacing in the case of beam forming, or with sampling rates faster than the Nyquist rate, in the case of time or frequency domain processing.

In the case of beamforming of antenna arrays, there is a real-world constraint on the number of physical antenna elements and/or the associated analog-to-digital converter channels may be limited to a relatively small number. These constraints limit the achievable gain in resolution derivable from higher resolution methods such as DHT or MSGT which perform better (achieve higher resolution and array gain) with a higher degree of spatial oversampling. Therefore a useful addition to Hermetic Transform and/or MSG beamforming approach is a type of interpolation used to create signals synthetically which "fill-in" missing data using a smaller number of inputs from physical elements. This discussion is readily extended to spectrum analysis.

Figure 8:
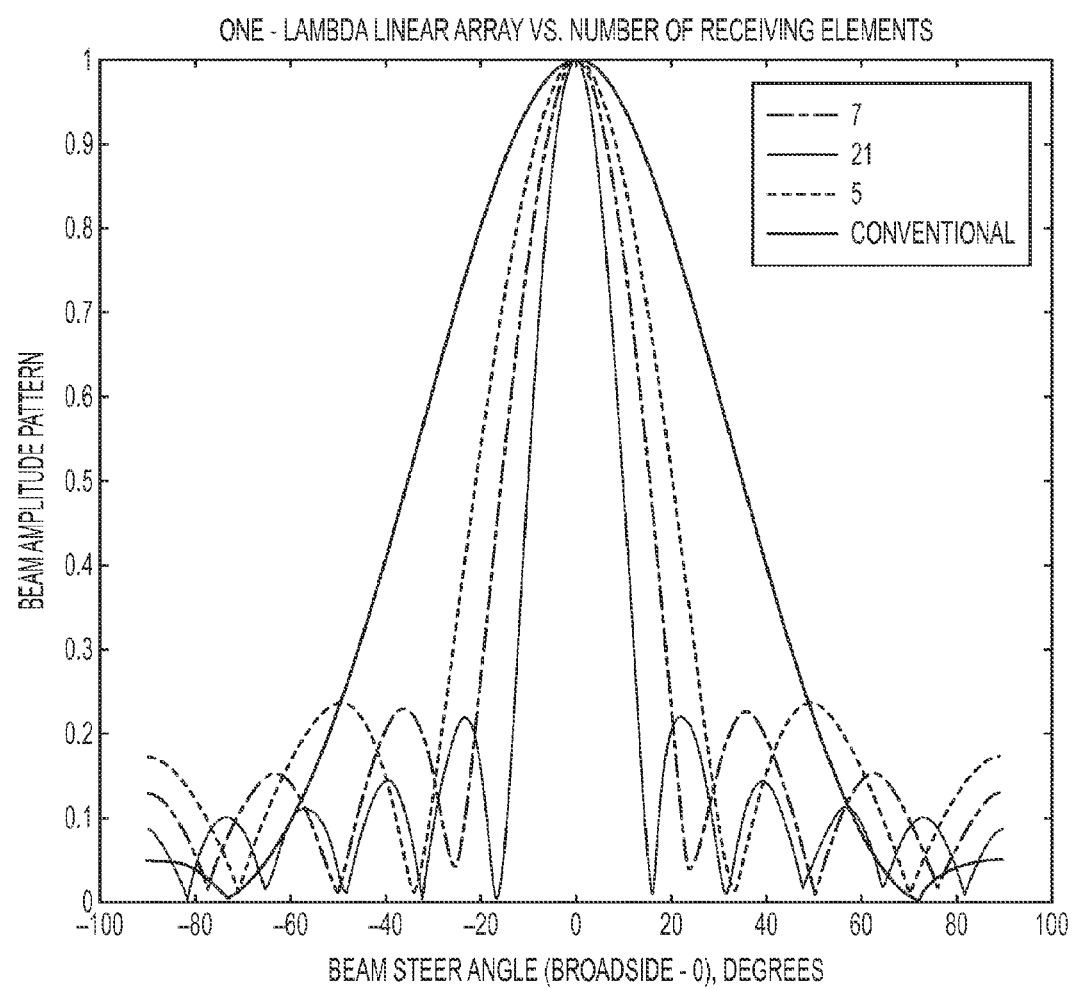

A typical result involving the increase of resolution from adding additional physical elements for an array of a fixed physical dimension (aperture size) is shown in FIG. 8. A calculation of the conventional amplitude (e.g. voltage response, not power) beam-pattern of an array of one wavelength (lambda=1), is shown in the plot immediately below (black curve). With the conventional resolution formula, θ=λ/D, a linearly disposed array which is one-lambda in length (θ=λ/D=1) should produce a beam of extent approximately one radian, (about 57 degrees). By inspection, it is seen that the black curve in the plot indicates a beam which is approximately this extent, the other curves shown in the figure below indicate amplitude beam patterns calculated with 2-degree resolution using Hermetic Transform Beam Forming on linear arrays of the same aperture (D=one-lambda) for various numbers of physical elements. The minimum number of elements needed to satisfy the spatial Nyquist criterion is 3 (half-wavelength spacing).

In FIG. 8, results are shown for patterns corresponding to conventional, 5 elements, 7 elements, and 21 elements, each of the latter three curves corresponding to different degrees of spatial oversampling, and sharing an increasingly and successively narrow main peak. The 21-element pattern corresponds to 10-times oversampling relative to the Nyquist sampling criterion for the minimum sampling required to avoid grating lobes (spatial aliasing). It can be seen from the plot that the beam-width becomes smaller as the number of elements increases, however, at some point, a minimum beam width is reached. In this case, the baseline Hermetic Transform Algorithm reaches a minimum width of 14 degrees, approximately ¼ of the conventional beam width.

With sampling above Nyquist, intermediate spatial samples can be determined, and this array consisting of actual plus synthetic samples can be used to increase resolution with the Hermetic Transform.

A useful limiting case is one where every calibration vector direction ($\theta_k$) provides a separate interpolation matrix, ending up with a set of interpolation matrices, $\{M_i, i=1, 2, \ldots N_B\}$ where $N_B$ is the number of calibration vector directions. A general interpolation matrix can be formed by taking an appropriate linear combination of the individual interpolation matrices, each of which maps a P-element output that the array would see for a particular direction ($\theta_k$) into a Q-element array output for the identical direction ($\theta_k$).

$$M = \Sigma_i C_i M_i$$

It practical applications there various methods available for generating the linear combining coefficients, $\{C_i\}$: For the case of a P-element vector signal vector, S, with components $S_j$, which represents a time-snapshot of P outputs from a P-element array being interpolated to create Q synthetic elements, with Q>P, the i-th interpolation matrix weighting coefficient $C_i$ is determined according to the wave-number spectrum content of the original signal in the i direction. One approach is to map the input signal array vector onto the $N_B$ directions using the Hermetic Transform and add together the interpolated arrays for each direction weighted by the component of signal in each direction. Another approach is to pre-filter the signal using a beam transform, then apply the pre-determined spatial filter response as a set of weighting coefficients.

Simulation results of the process are shown in the provisional application. The results of a 4 to 16 element array synthesis, followed by beamforming with a Hermetic Transform appropriate to a 16-element array (with dots) as compared to the ideal case result of Hermetic beamforming a 16-element array showing the narrowest peak, and Hermetic beam forming the 4-element array directly with a broader peak for a one-lambda length linear array.

The main lobe of the synthetic beam is effectively preserved, while side-lobes are maintained at a similar level to that obtained with a full complement of 16 elements.

The process works because, with spatial oversampling with even 4 elements in a one-lambda length array, the intermediate spatial samples can be effectively recovered (synthesized) using interpolation.

Hermetic Beam-Forming for Signal Transmission Sample Results with an N-Element Antenna Array Prior U.S. Pat. No. 8,064,408 focuses more on receiving. A modified version of the above approach can be applied to transmit arrays. Beginning with a standard expression of the electric field (E) from an array excited with a specified current density, Js as seen below, Well-Known Farfield Radiation Amplitude Result (E-Field) at a Single Frequency of an Array Excited with Antenna Current Density (Js)

$$\vec{E}(\vec{r}) \approx \frac{-j\omega\mu}{4\pi r} e^{-jkr} \iint_s \vec{J}_s \, e^{jk(\vec{r}\cdot\hat{r})} ds'$$

Integral Acts Like Matrix Multiply

Current Excitation Vector

Fourier Transform Matrix elements Resulting From Green's Function one can design a set of current densities for the set of antenna elements in the array in order to create a pattern as narrow as possible. With respect to the above equation, the following notations are made:

Reciprocity

Note: previous result corresponds to standard notation with $j=-i=-(-1)^{1/2}$

Transmitting Array Excitation is normally the complex conjugate of array receiving manifold $\{\Sigma(\theta,\phi)\}\ldots$ from reciprocity Note: (polarization index suppressed)

$k=k(\theta,\phi)$; assume $(\theta,\phi)$ are discrete $\{\theta_m,\phi_n\}$

Standard Equation is $B(\theta,\phi)=\Sigma^H F$

B is beam amplitude pattern, F is the

Fourier Matrix from the radiation integral

Replace Fourier integral with discrete sum

A general result which uses a transmitting Hermetic Transform has been developed which is stated below:

$$\underline{\Sigma^H W F} = \underline{\beta}$$

$$\underline{W} = (\Sigma\Sigma^H)^{\#} \Sigma \underline{\beta} (F^H)(\underline{FF^H})^{\#}$$

The F is the transmit Greens Function matrix, the $\Sigma^H$ term corresponds to the excitations obtained by reciprocity from the array receiving response manifold, i.e., the complex conjugate excitations, and the weight matrix W is used in the transformation of the conjugate excitations to produce a set of excitations which produce the response $\beta$. For the maximum directivity, $\beta=c$ I.

To convert from current to voltage, we need to first obtain the mutual impedance matrix Z for the array from data or model and form the relationship V=I Z to derive the appropriate voltages for driving the array. Both the manifold and the mutual impedance can be derived using a model such as NEC-4 or can be derived empirically.

Representative Transmit Beam Results

The improved transmit directivity which results from this approach is illustrated by the beam pattern shown in the provisional application calculation below. The array is a 24-element circular array of dipole antennas (or monopoles) over a perfect ground plane with an array diameter of one quarter wavelength. The conventional equivalent is ominidirectional. One pattern is in decibels (dB) while the other pattern is power.

Processing Apparatus

In all the embodiments and implementations shown here, processing can be done with any form of suitable processor, whether implemented in hardware or software, in application-specific circuitry, or special purpose computing. Any software programs that are used can be implemented in tangible media, such as solid state memory or disc-based memory. The forms of processing can generally be considered to be "logic," which can include such hardware or software of combined hardware-software, implementations. The computing can be done on a standalone processor, groups of processors, or other devices, which can be coupled to memory (such as solid state or disc-based) for showing input and output data, and provide output, e.g., via screens or printers.

Systems of this type are shown in more detail, for example, in U.S. Pat. No. 8,064,408, e.g., at FIGS. 2 and 4.

Creation of Spatial Filters Using Hermetic Transforms

Figure 9:
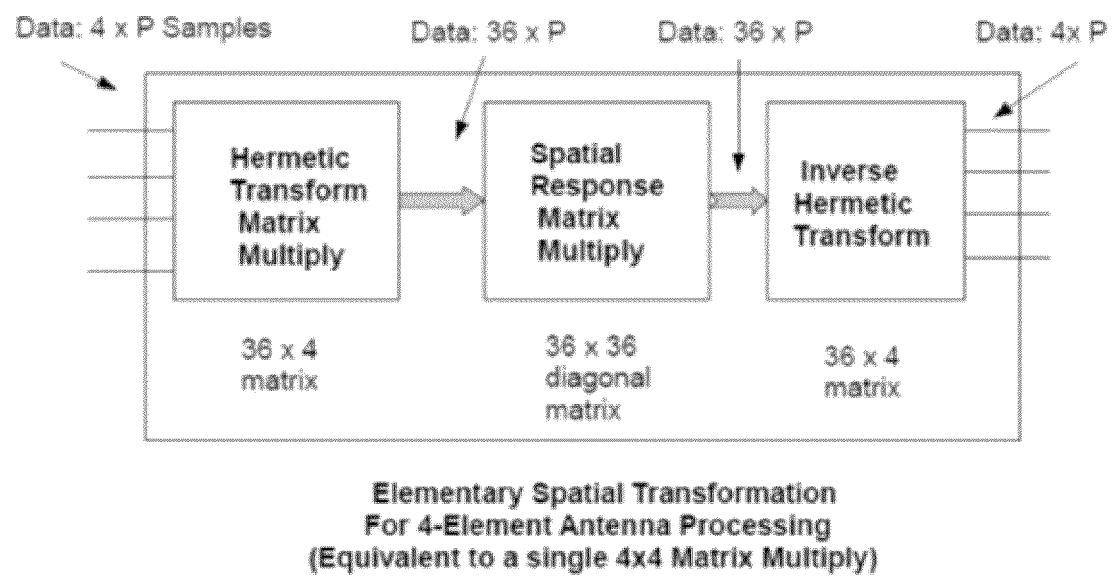
FIGS. 9-14 are block diagrams and plots showing use in detecting a jammer.

The Hermetic Transform can be used to create elemental spatial filters which contain a single direction of signal rejection (nulling) (analogous to a "zero" in the transfer function of a conventional digital filter) or a single direction of signal enhancement (analogous to a "pole" in the transfer function of a conventional digital filter). Referring to FIG. 9, the system under study makes us of four (4) antenna channels with coherent sampling of in-phase and quadrature (I&Q) components of the data. Therefore each elemental transform is a complex, 4×4 matrix (4-rows, 4 columns). One elemental "pole" and one elemental "zero" were created for each of the look directions in the manifold (for this study, there are 36 look directions spaced 10 degrees apart, therefore 72 elemental transforms). This process can be accomplished offline to create a set of 4×4 matrices, each of which satisfies a particular specification (rejection or enhancement of signals from one direction.)

Combining of transforms from the elemental sort into more complex arrangements can be used to create spatial filters according to a desired specification. For simplicity, the specification for the spatial response of each filter has "pass-sectors" (analogous to "pass-bands" in conventional digital filtering) each with a desired amplitude of 1, and "reject-sectors" (analogous to "stop-bands" in conventional digital filtering). A genetic algorithm is used to create these arrangements, which end up being (still) 4×4 matrices.

Figure 10:
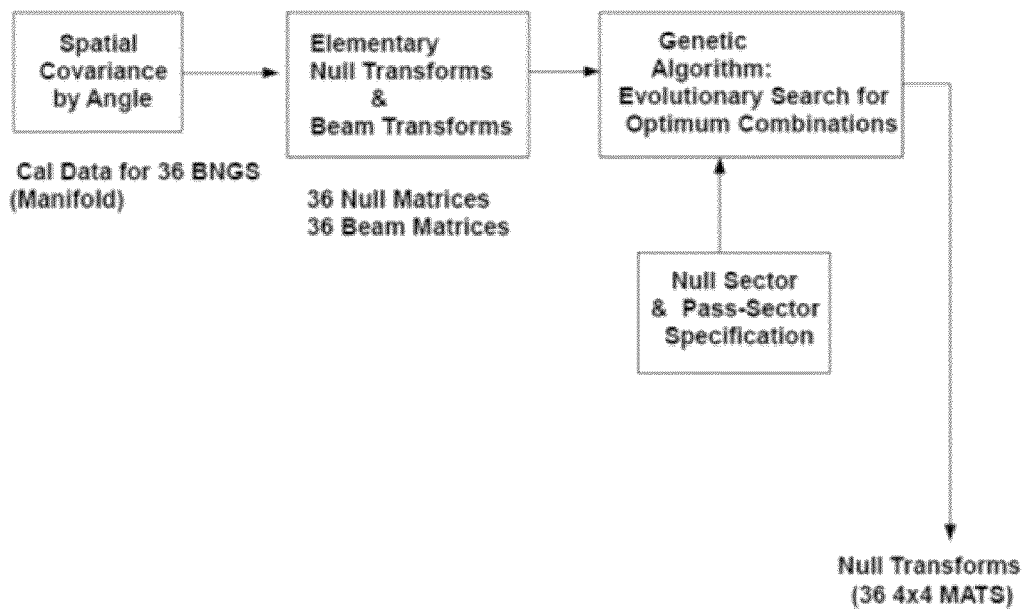

FIG. 10 indicates an off-line procedure for making more general spatial transforms. The current genetic algorithm uses a set of the original 72 transform matrices plus all possible sums and products of pairs of these transforms. The genetic algorithm guarantees a reasonable solution without the combinatorial explosion associated with a search of all possible solutions.

Experiment Description

The methodology for the study has been to create simulations which allow complete control in MATLAB, supplemented by processing of data collections taken with the existing 4-channel test bed. The existing test-bed is a dual band system which operates in at cellular frequencies. The simulations to date have been conducted for an RF carrier frequency of 900 MHz. The 4-channel antenna is approximately 3 inches in diameter. The figure below indicates the experimental setup for the general MATLAB simulation.

Figure 11:
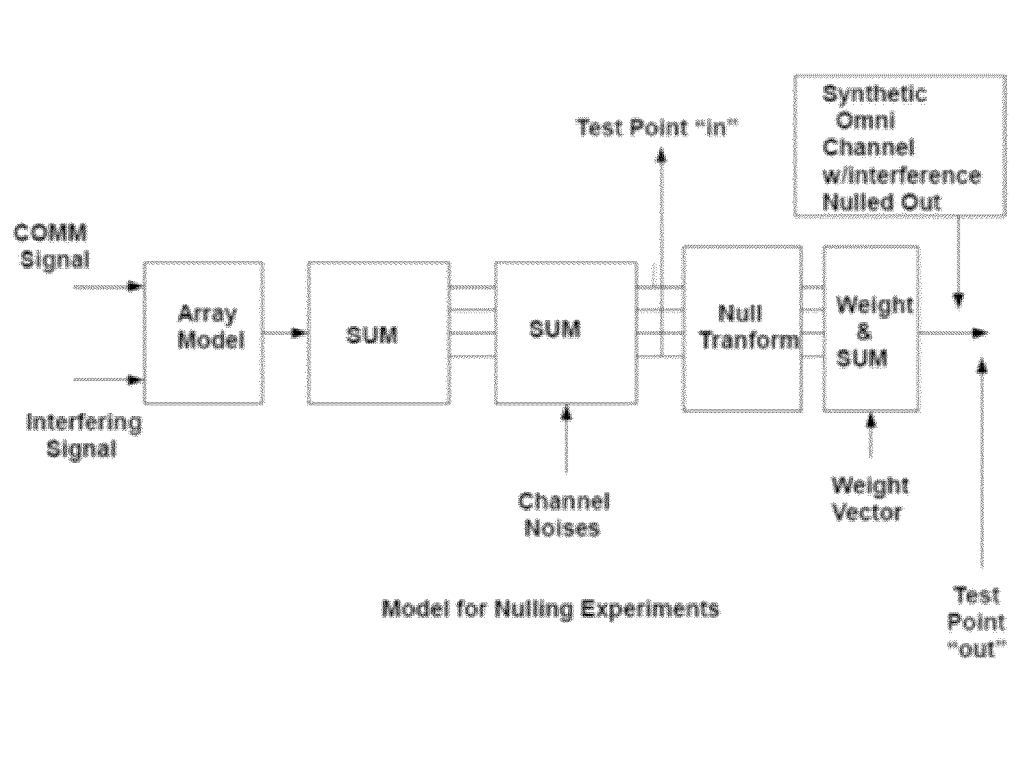

Referring to FIG. 11, an array model is applied to four-channel data from both a given communications signal ("COMM") and interference/jammer signal ("JAM") and summed, then added to simulated internal system noise. The internal noise is set so that the signal to internal noise ratio is +20 dB. The jammer signal strength is arbitrary. Two test points are set up to measure the result of the nulling. A best set of omni-weights is derived as described above, and applied to the four channels at Test Point "in" (prior to applying the nulling matrix), and to the output of the nulling step to create Test Point "out".

Figure 12:
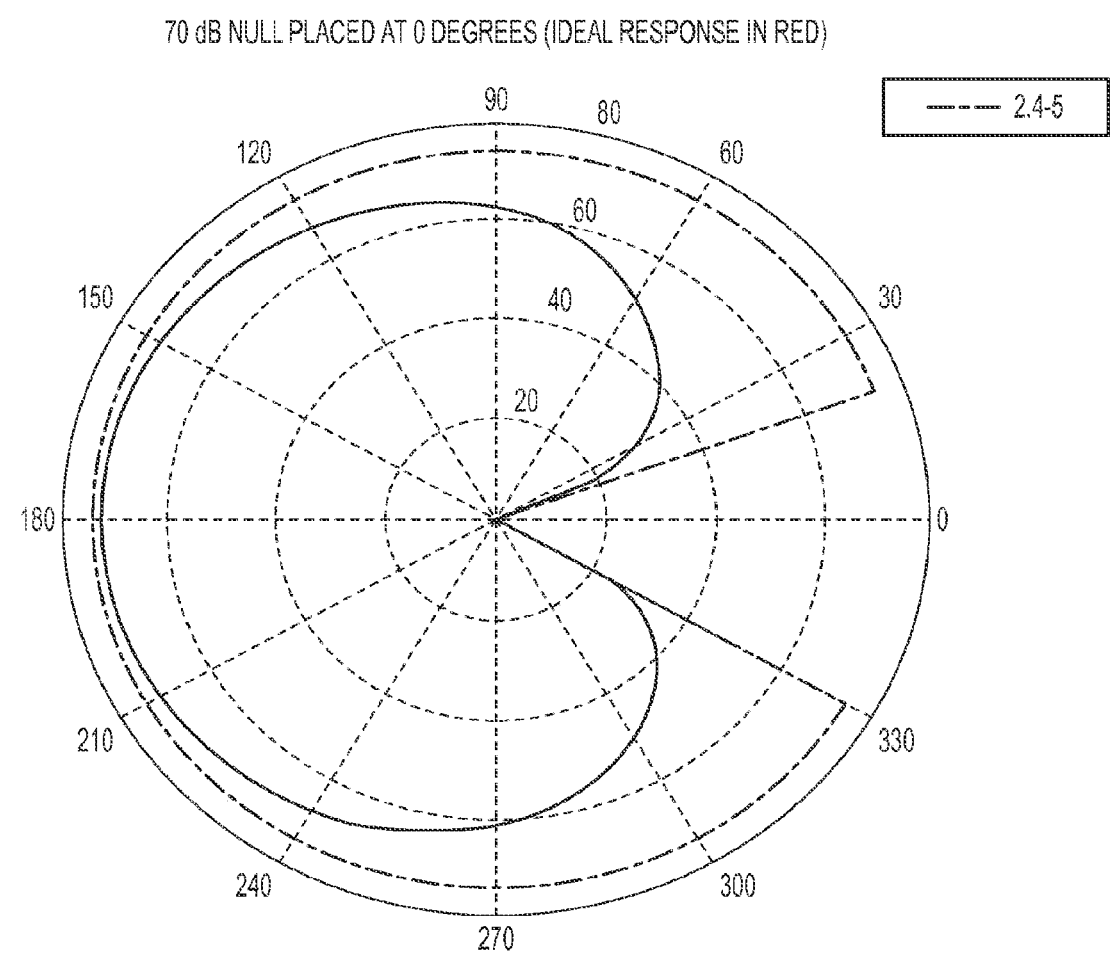

The genetic algorithm supplies a plot of the desired spatial response which can be compared to the desired/specified spatial pattern. Referring to FIG. 12, for a null at zero, a pattern was derived as a prediction of the genetic algorithm, based on calibration from noiseless 10-bit LFSR/MSK signals used as the COMM signal (below). The pattern is measured in decibels (dB) from the pattern minimum, located at the null of the pattern. The desired (ideal) pattern is shown with a sharp wedge pattern. The depth of null as shown is approximately 70 dB.

Figure 13:
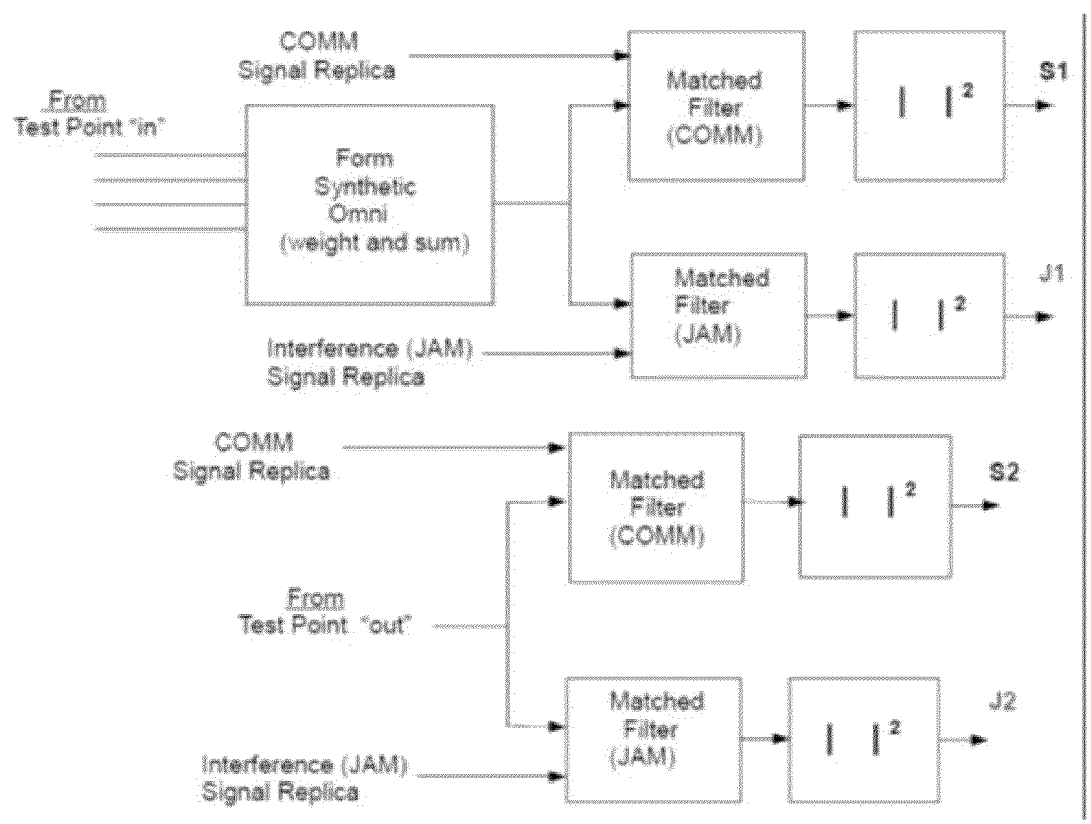

Referring to FIG. 13, the processing performed on the "in" data and "out" data is shown. The jammer data is chosen as 11-bit LFSR/MSK which occupies the same spectrum as the signal. The combined signal is matched filtered (replica correlated) at both the "in" Test Point and "out" Test Point, using both the signal replica and the jam signal replica, in order to determine the signal gain and the jammer gain through the process. The outputs of the matched filters (replica correlators) are converted to power (magnitude squared of the complex data). The signal-to-jammer gain is the signal gain minus the jammer gain. The results are compiled in dB. The replica correlator is known to be the optimal processor for the case where the noise is white and Gaussian; if this were not the case a noise pre-whitener would be employed to achieve maximum SNR.

Processing Steps to Determine Signal Gain and Jammer Gain

Figure 14:
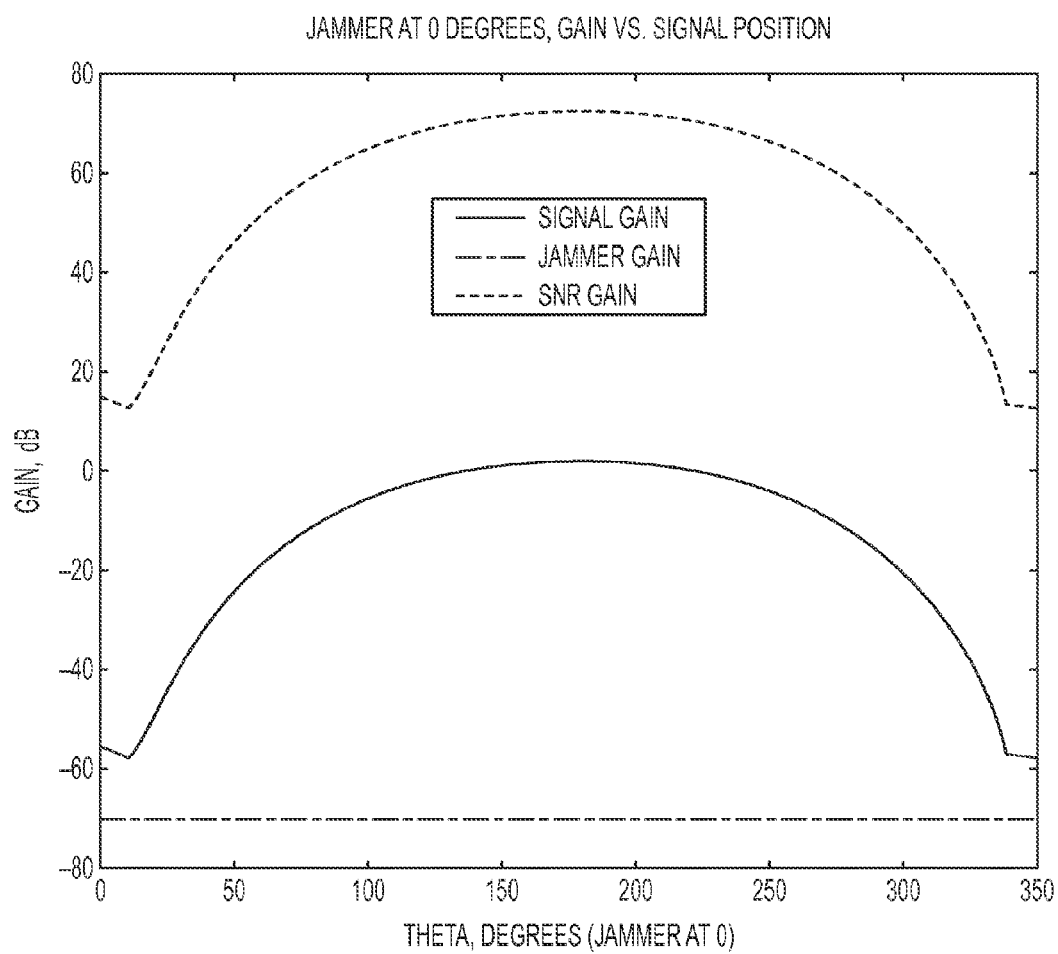

The results obtained from the HCW simulation are shown in FIG. 14. Signal Gain, Jammer Gain, and combined (S/J Gain) are shown. The x-axis is the position of the signal, while the jammer remains fixed at 0 degrees, where the null has been placed. A significant gain against the jammer is observed, matching prediction based on the null pattern response alone. The jammer gain is seen to remain constant (as it should) as the signal is moved, at approximately −70 dB.

The HPMV simulation verifies the null value, but shows a jammer gain which moves with the signal, this being attributed to non-zero correlation between the 10-bit LFSR signal for the COMM signal and the 11-bit LFSR signal for the JAM. An adjustment to that simulation is being made to correct this issue. Another artifact that results from this correlation is the appearance of S/J gain varying with jammer power. Since the process is linear (the null transform is a simple 4×4 matrix multiply) the gain should be a constant. The jammer gain showing dependence on signal position and also showing dependence on jammer power is proof of artifacts in the prior simulation results.

The genetic algorithm produces equally good patterns for nulling in the other directions, for example, the pattern below derived for a null position at 270 degrees, giving a −70 dB null. Results with the HCW simulation thus how that the performance in the other directions is the same and is only dependent on the relative position of null and jammer and does match what is expected based on the beam patterns of each given null.

Other embodiments are within the claims. For example, while the disclosure mainly discusses antennas, other signal receivers could be used, and with data other than I&Q data.

What is claimed is:

1. A system comprising:
a plurality of N elements for receiving signals;
analog to digital circuitry for processing the received signals to produce digital signals;
a processor for receiving signals corresponding to a plurality of beam directions and forming the signals in a matrix, including for one beam direction, setting values to zero to derive a covariance matrix from signal arrivals from other beam directions other than the one direction, and deriving a beam vector from a signal vector and the covariance matrix.

2. The system of claim 1, wherein the processor performs the functions of setting values to zero to derive the covariance matrix from signal arrivals for from other beam directions other than the one direction, and deriving a beam vector from a signal vector and the covariance matrix, for a plurality of beam directions.

3. The system of claim 1, wherein the elements include antennas.

4. The system of claim 1, wherein the system receives and processes I&Q data.

5. The system of claim 1, wherein the system is operatively coupled to a cellular base station for identifying a direction of arrival of one or more mobile units.

6. A method comprising:
receiving analog signals with a plurality of N elements;
processing the received signals to produce digital signals;
receiving signals corresponding to a plurality of beam directions and forming the signals in a matrix, including for one beam direction, setting values to zero to derive a covariance matrix from signal arrivals from other beam directions other than the one direction; and
deriving a beam vector from a signal vector and the covariance matrix.

7. The method of claim 6, wherein the setting values to zero to derive the covariance matrix is performed from signal arrivals from other beam directions other than the one direction, further comprising deriving a beam vector from a signal vector and the covariance matrix, for a plurality of beam directions.

8. The method of claim 6, wherein receiving analog signals includes receiving wireless signals with antennas.

9. The method of claim 6, wherein the beam vector is used to identify a direction of arrival of one or more mobile units in a cellular system.

* * * * *